United States Patent
Clark et al.

(10) Patent No.: US 11,487,994 B2
(45) Date of Patent: Nov. 1, 2022

(54) TECHNIQUES FOR ESTIMATING AND FORECASTING SOLAR POWER GENERATION

(71) Applicant: Sacramento Municipal Utility District, Sacramento, CA (US)

(72) Inventors: Remington Clark, Citrus Heights, CA (US); Jeff Berkheimer, Rancho Murieta, CA (US)

(73) Assignee: Sacramento Municipal Utility District, Sacramento, CA (US)

(*) Notice: Subject to any disclaimer, the term of this patent is extended or adjusted under 35 U.S.C. 154(b) by 850 days.

(21) Appl. No.: 16/255,604

(22) Filed: Jan. 23, 2019

(65) Prior Publication Data

US 2020/0026982 A1    Jan. 23, 2020

Related U.S. Application Data

(60) Provisional application No. 62/700,728, filed on Jul. 19, 2018.

(51) Int. Cl.
*G06N 3/04* (2006.01)
*G01W 1/10* (2006.01)
(Continued)

(52) U.S. Cl.
CPC ............ *G06N 3/0427* (2013.01); *G01W 1/10* (2013.01); *G01W 1/12* (2013.01); *G06N 3/084* (2013.01); *H02S 50/00* (2013.01)

(58) Field of Classification Search
CPC ....... G06N 3/0427; G06N 3/084; G01W 1/10; G01W 1/12; H02S 50/00; Y02E 10/50; Y02E 10/56; Y04S 10/50
See application file for complete search history.

(56) References Cited

U.S. PATENT DOCUMENTS

| | | |
|---|---|---|
| 8,682,585 B1 | 3/2014 | Hoff |
| 9,857,778 B1 | 1/2018 | Khabibrakhmanov et al. |

(Continued)

FOREIGN PATENT DOCUMENTS

| | | |
|---|---|---|
| JP | 2013-074695 A | 4/2013 |
| JP | 2013-253805 A | 12/2013 |

(Continued)

OTHER PUBLICATIONS

Roytelman et al., Volt/VAR Control and Conservation Voltage Reduction as a Function of Advanced DMS, IEEE (Year: 2016).*

(Continued)

*Primary Examiner* — Mohammad K Islam
(74) *Attorney, Agent, or Firm* — InventIQ Legal LLP; Steven J. Cahill

(57) ABSTRACT

A computer system is configured to group solar power systems that provide electric power to an electricity distribution system into clusters. The computer system identifies a solar source meter in each of the clusters that is representative of the respective one of the clusters as a bellwether meter. Each of the bellwether meters monitors a power output of one of the solar power systems in one of the clusters. The computer system receives solar power generation data from the bellwether meters. The computer system generates a solar power generation forecast for each of the clusters of the solar power systems using the solar power generation data from the bellwether meters in respective ones of the clusters.

25 Claims, 10 Drawing Sheets

(51) Int. Cl.
   *G06N 3/08* (2006.01)
   *G01W 1/12* (2006.01)
   *H02S 50/00* (2014.01)

(56) References Cited

U.S. PATENT DOCUMENTS

| | | |
|---|---|---|
| 9,880,230 B1 | 1/2018 | Hoff |
| 10,103,538 B1* | 10/2018 | Xiong .................... H02H 7/122 |
| 10,331,089 B2* | 6/2019 | Khabibrakhmanov ...................... G01W 1/12 |
| 2011/0276269 A1 | 11/2011 | Hummel |
| 2013/0258068 A1 | 10/2013 | Schmidt et al. |
| 2016/0019323 A1* | 1/2016 | Tsuruta ............. H01L 31/02021 703/18 |
| 2016/0033986 A1 | 2/2016 | Kamel et al. |
| 2017/0104449 A1 | 4/2017 | Drees |
| 2017/0286838 A1* | 10/2017 | Cipriani ................. G06N 20/00 |
| 2018/0143348 A1 | 5/2018 | Menicucci et al. |
| 2018/0203160 A1 | 7/2018 | Dong et al. |
| 2018/0275314 A1 | 9/2018 | Pavlovski et al. |
| 2020/0044449 A1* | 2/2020 | Ottewill ................... G06N 3/08 |
| 2020/0059098 A1* | 2/2020 | Dong ....................... H02J 3/144 |
| 2021/0305937 A1* | 9/2021 | Kim ........................ H02S 20/23 |

FOREIGN PATENT DOCUMENTS

| | | |
|---|---|---|
| KR | 10-1366874 B1 | 2/2014 |
| WO | 2017035629 | 3/2017 |

OTHER PUBLICATIONS

Korean Intellectual Property Office, International Search Report for international application PCT/US2019/040971, dated Oct. 25, 2019, pp. 1-3.

Korean Intellectual Property Office, Written Opinion of the International Searching Authority for international application, PCT/US2019/040971, dated Oct. 25, 2019, pp. 1-5.

European Patent Office, the Extended European Search Report including the supplementary European search report and the European search opinion for European patent application 19 838 382.0, dated Mar. 15, 2022.

* cited by examiner

TECHNIQUES FOR ESTIMATING AND FORECASTING SOLAR POWER GENERATION

CROSS REFERENCE TO RELATED APPLICATION

This patent application claims the benefit of U.S. Provisional Patent Application No. 62/700,728, filed Jul. 19, 2018, which is incorporated by reference herein in its entirety.

FIELD OF THE DISCLOSURE

The present disclosure relates to techniques for estimating and forecasting solar power generation of solar power systems.

BACKGROUND

A solar power system converts energy from sunlight into electricity, typically using photovoltaic cells or concentrated solar power, without using fossil fuel energy sources. A disadvantage of solar power is that the power output of a solar power system changes based on variations in the amount of sunlight impacting the solar power system. The amount of sunlight impacting a solar power system changes based on the time of year, the time of day, weather conditions, dirt on the solar cells, the age of the solar power system, and other factors.

DETAILED DESCRIPTION

Figure 1A:
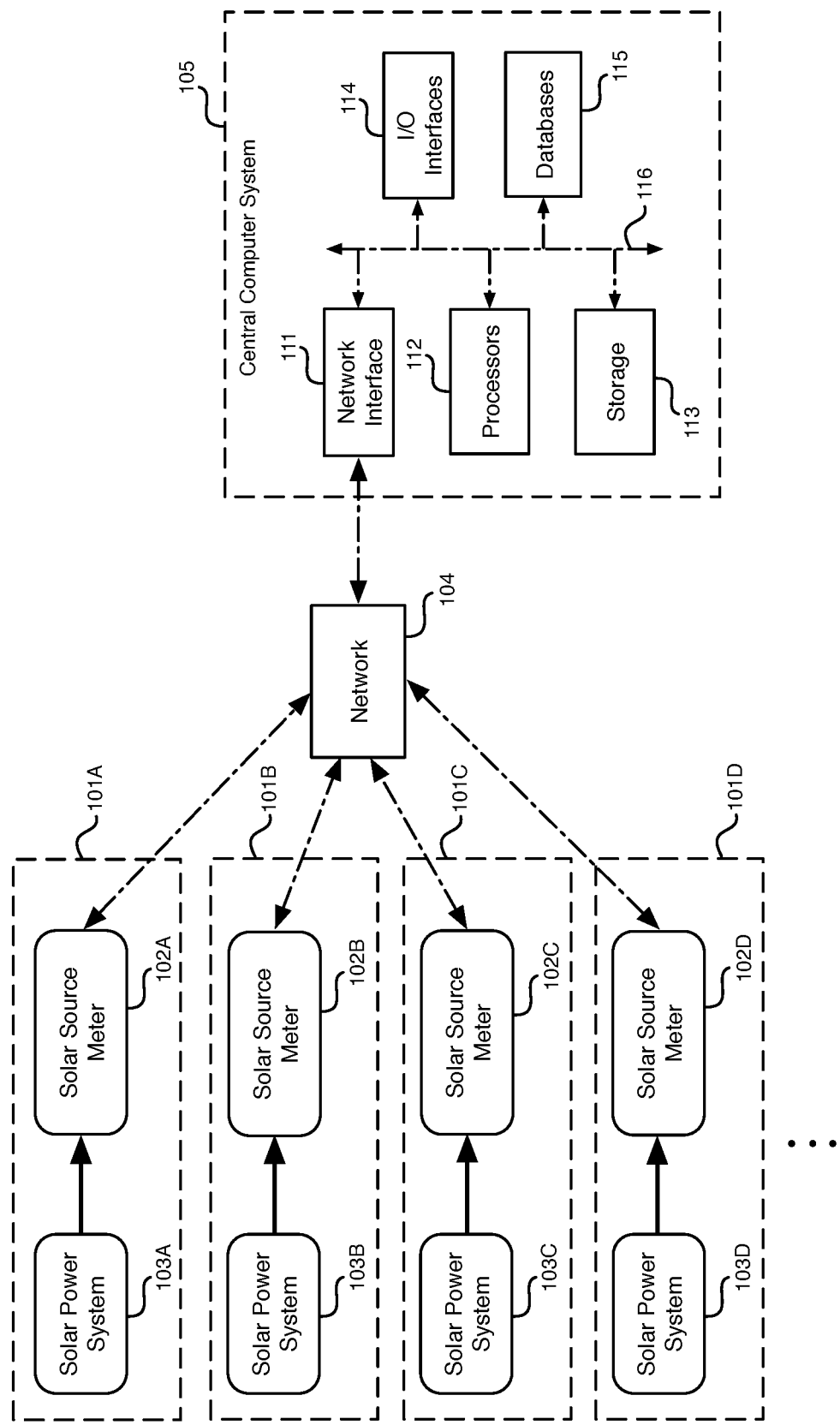
FIG. 1A is a diagram illustrating an exemplary system for transmitting data relating to electric power between utility customer sites and a central computer system, according to an embodiment.

For the reasons discussed above, it can be a challenge for an electric utility to forecast the amount of power output that solar power systems will provide to an electricity distribution system (also referred to as an electric grid). Forecasting the power output of solar power systems is usually more accurate on sunny days when variable weather conditions do not significantly impact solar power generation. Factors that may impede the generation of solar power on sunny days include, for example, heat, dirt, degradation of a solar power system, and position of the solar power system. Forecasting solar power generation becomes more difficult on cloudy days. On a cloudy day, solar power generation also varies based on clouds blocking direct sunlight from impacting the solar power systems at various times of the day. Clouds are unpredictable. Some forecasting systems use satellite imagery along with wind speed, height of a cloud, position of the sun, and a projection of the shadow of the cloud in order to try to determine which way a particular cloud is going to travel. Weather based forecasting has disadvantages for electric utilities, including the latency in receiving the satellite imagery and the cost for a third party weather service to produce a forecast irradiance model.

According to some embodiments disclosed herein, a solar power estimation and forecasting system (SPEFS) uses bellwether meters in clusters of solar power systems to generate an estimation of current solar power generation and a forecast of future solar power generation of the solar power systems. The solar power systems are connected to an electricity distribution system (EDS) that is controlled by an electric utility. These embodiments may obviate the need for a third party weather service provider to produce a forecast irradiance model for solar power generation. Instead, an electric utility can control solar power generation estimation and forecasting.

In some embodiments, each customer site that has a solar power system connected to the electricity distribution system (EDS) may also have a net electric meter and/or a solar source electric meter. A net electric meter records the total power provided to a customer site from the EDS along with subtracting the total power provided by any solar power system at the customer site to the EDS. A solar source electric meter (also referred to herein as a solar source meter) records the power generation output of a solar power system at a customer site. The solar source meters can also be used as irradiance meters in the electricity distribution system.

The solar power estimation and forecasting system (SPEFS) allows a user to define a number of clusters of solar power systems in local areas of the electricity distribution system. The user can cause the SPEFS to generate more clusters in order to generate a more accurate forecast model. Based on these clusters, the SPEFS determines the most representative solar source meter in each cluster and then uses that representative solar source meter as a bellwether meter. The SPEFS can receive frequent updates of the solar power generation of the solar power systems monitored by the bellwether meters. The bellwether meters throughout the electricity distribution system are used to create an estimation of the current power output of the solar power systems. The bellwether meters are also used to create an initial day ahead forecast and/or a short term forecast (e.g., in the range of 1-15 minutes) of solar power generation. Solar power generation data from the bellwether meters are used to develop readings for solar irradiance values in each cluster. Based on the relationship of each bellwether meter to its respective cluster, solar power generation from all of the other solar source meters in that respective cluster is estimated and given an updated near real time (e.g., 1-15 minute ahead) forecast of solar power generation. With an aggregate of the solar power generation in each cluster of solar power systems, an accurate representation of each individual solar power system within each cluster can be produced with a distribution of the forecast and the estimate.

Thus, the SPEFS can use real time solar power data from the bellwether meters to create a solar power generation forecast and an estimate of the current power output of the solar power systems. The SPEFS can modify the solar power estimate and forecast based on a predicted cloud movement through the local area of the electricity distribution system using the real time solar power data. The SPEFS can make predictions of solar power generation based on snapshots of the real time solar power data from the bellwether meters and determine the solar power generation ramp rates of all of the solar power systems in each cluster based on the real time solar power data from the bellwether meters.

In some embodiments, the only solar source meters in the electricity distribution system (EDS) that are used to generate the estimate of current solar power generation and the forecast of future solar power generation are the bellwether meters. In these embodiments, an electric utility can choose to strategically deploy only one solar source meter in each cluster as a bellwether meter at a selected customer site. By deploying only one solar source meter in each cluster as a bellwether meter, an electric utility can avoid the cost of deploying solar source meters at each customer site having a solar power system in the EDS. Instead, an electric utility can deploy a far fewer number of solar source meters as the bellwether meters to achieve highly accurate solar power generation estimates and forecasts.

According to some embodiments disclosed herein, a SPEFS can generate highly accurate estimates of current solar power generation and forecasts of future solar power generation for an aggregate of solar power systems in an electricity distribution system. As examples that are not intended to be limiting, the SPEFS can generate a solar power generation forecast for an electricity distribution system that is at least 98% accurate on sunny days and at least 90% on cloudy days. When the solar power generation forecast is distributed down to the level of individual solar power systems, the accuracy of the forecast may be within +−10%. The solar power generation estimates and forecasts are highly accurate for the entire electricity distribution system, regardless of the accuracy of individual solar source meters. The SPEFS can obviate the need for a third party weather forecasting service to run forecasting analytics. The SPEFS can generate the estimates and the forecasts much faster than weather forecasts, because real time data from bellwether meters is used on cloudy days to back propagate and auto correct the solar power forecasts and estimates.

In some embodiments, the SPEFS uses an artificial neural network (ANN) to forecast solar power generation on an electricity distribution system (EDS). The SPEFS can also include an algorithm that learns the relationship of weather, temperature, dew point, humidity along with many other factors in parallel with historical load consumption patterns to create a day ahead forecast. The mean absolute percent error (MAPE) is then evaluated to generate a very short term forecast, (e.g., 1 minute to 1 hour ahead) and/or a day ahead forecast.

According to some embodiments disclosed herein, a bottom up approach is used to generate a solar power forecast on a micro level down to individual solar power systems and aggregate up to create a forecast for solar power generation throughout an electricity distribution system (EDS). Using the data from the bellwether solar source meters, the MAPE may converge, as an example, at a residential level at around 50 kilowatt hours (kWh) to 96% accuracy. This technique can be applied to forecasting solar power generation in a two-tier approach for sunny days and highly variable cloudy days. Machine learning is used to develop clusters of solar power systems and forecast solar power generation for each cluster with relatively high accuracy. With this forecast model, the forecasted solar power generation is distributed to each individual solar power system to assist with state estimation on the EDS.

FIG. 1A is a diagram illustrating an exemplary system for transmitting data relating to electric power between utility customer sites and a central computer system, according to an embodiment. In the embodiment of Figure (FIG. 1A, utility customer sites 101A, 101B, 101C, and 101D (collectively referred to herein as utility customer sites 101 or customer sites 101) include solar power generation systems 103A, 103B, 103C, and 103D (collectively referred to herein as solar power generation systems 103 or solar power systems 103), respectively. As an example, each of the solar power generation systems 103 may include an array of solar photovoltaic (PV) panels at one of the customer sites 101 (e.g., on the rooftop of a building). As other examples, solar power systems 103 can also include one or more concentrated solar power systems, hybrid solar power systems, and/or any combination thereof. Utility customer sites 101A, 101B, 101C, and 101D also include solar source electric meters 102A, 102B, 102C, and 102D (collectively referred to herein as solar source meters 102), respectively. Solar source meters 102 measure and record the electric power output of their respective solar power generation systems 103. Utility customer sites 101 may be, for example, residential, businesses, or a combination thereof. In some embodiments, some of the solar power systems 103 may not have solar source meters.

Each of the solar source meters 102 is connected through a network 104 to a central computer system 105. The data communication channels are shown in FIG. 1A by lines having alternating long and short dashes. Each of the customer sites 101 is connected to receive electric power from an electricity distribution system managed by an electric utility. The electricity distribution system is not shown in FIG. 1A. Each of solar source meters 102 receives and measures the electric power generated by the solar power generation system 103 at the respective customer site 101. The wires that transmit electric power (i.e., from systems 103 to meters 102) are shown in FIG. 1A by bold lines. Four utility customer sites 101 are shown in FIG. 1A as an example. Although it should be understood that an electricity distribution system may be connected to provide electric power to hundreds, thousands, or even millions of customer sites.

Each of the solar source meters 102 can periodically send real time data indicating the power generation output of the solar power generation system 103 at the respective customer site 101 through network 104 to computer system 105. The computer system 105 can use the solar power generation data from meters 102 to generate solar power estimates and forecasts for the electricity distribution system, as described in further detail below. Communications of data between the solar source meters 102 and computer system 105 may be through wireless connections, wires, power lines, or any combination thereof in network 104. Computer system 105 may, for example, be located at a facility that is operated by the electric utility.

FIG. 1A illustrates some exemplary components of computer system 105. In the example of FIG. 1A, computer system 105 includes a network interface 111, one or more processor devices 112, one or more storage devices 113, one or more input/output (I/O) interfaces 114, and one or more databases 115. Each of the components 111-115 of computer system 105 are connected through a communication system 116 (e.g., one or more busses and/or network connections). The components 111-115 of computer system 105 can communicate through system 116. In other embodiments, computer system 105 may include additional devices that are not shown in FIG. 1A and/or may not have one or more of the devices shown in FIG. 1A.

Network interface 111 receives data from and provides data to customer sites 101 through network 104. Processors 112 may include any number of processors and/or controller circuits/devices, such as, for example, a CPU (central processing unit), microprocessor, graphics processing unit (GPU), field programmable gate array, etc. Storage 113 may include volatile and/or non-volatile memory devices such as solid state memory devices, disc storage devices, magnetic tape, etc. The input/output (I/O) interfaces 114 may include, for example, devices for inputting data to the computer system 105 (e.g., a mouse and a keyboard), and mechanisms for providing results from the computer system 105 (e.g., printers and computer monitors). Databases 115 may, for example, include one or more storage devices, additional computers and processors, and associated database software. The storage devices may be organized into any suitable configuration, for example, a storage area network.

Data provided from solar source meters 102 through network 104 can be stored in storage devices 113 and/or in databases 115 in computer system 105. Software run on processors 112 can access this data for analysis, e.g., to generate solar power estimates and forecasts. The software can be stored in storage 113. One or more users may interface with the software using the one or more I/O interfaces 114. According to various embodiments, the SPEFS disclosed herein can include, computer system 105, including one or more of components 111-115, and associated software for generating a solar power forecast and an estimate of current solar power generation.

Figure 1B:
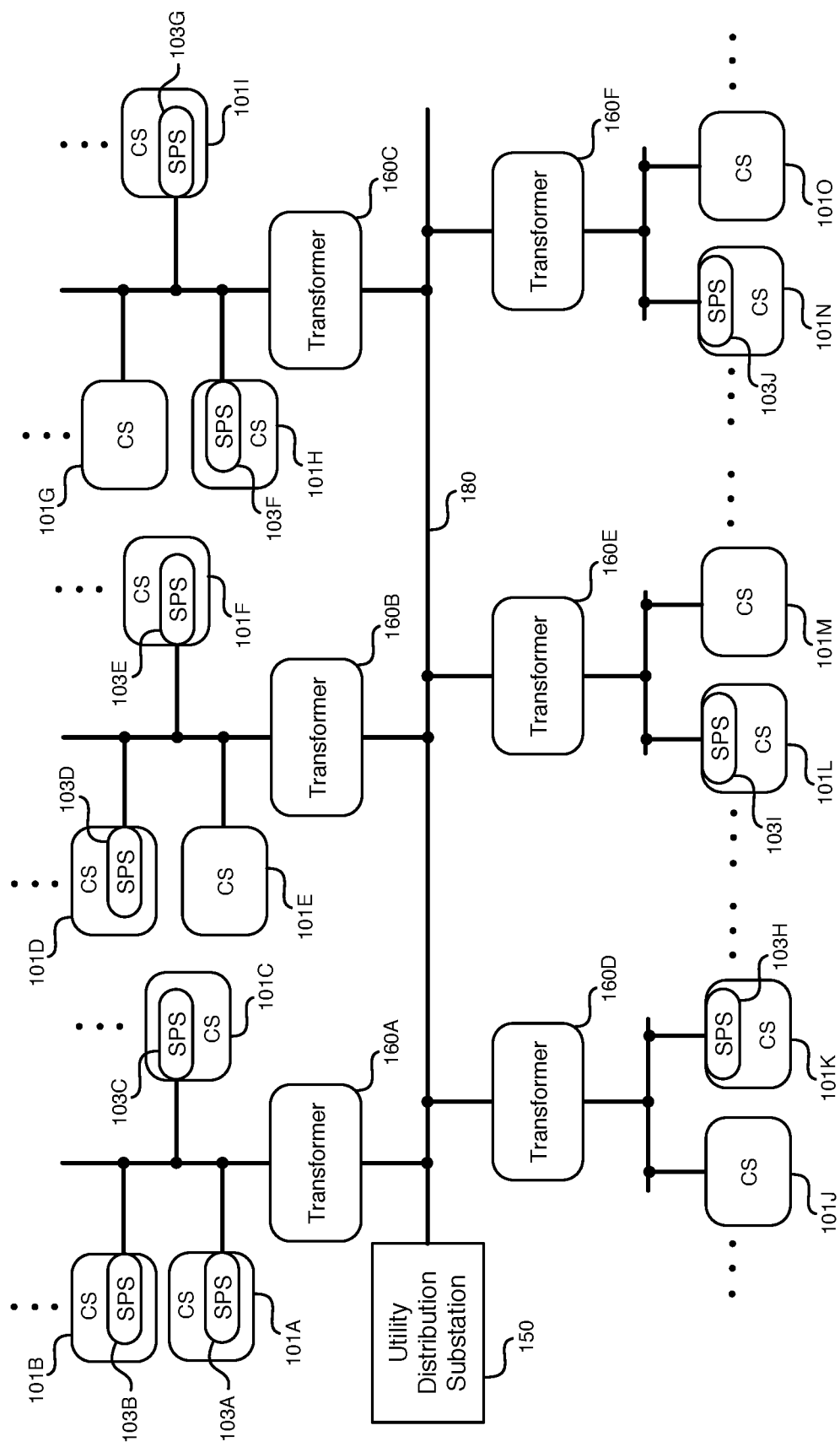
FIG. 1B is a diagram that shows an exemplary portion of an electricity distribution system (EDS), according to an embodiment.

FIG. 1B is a diagram that shows an exemplary portion of an electricity distribution system (EDS), according to an embodiment. In the embodiment of FIG. 1B, utility distribution substation 150 provides electric power through electricity distribution lines 180 and distribution transformers 160 to electricity consuming devices at customer sites 101. FIG. 1B shows 6 distribution transformers 160A-160F connected through distribution lines to 6 groups of customer sites (CS) 101A-101C, 101D-101F, 101G-101I, 101J-101K, 101L-101M, and 101N-101O, respectively. Some of the customer sites also have solar power systems. For example, customer sites 101A, 101B, 101C, 101D, 101F, 101H, 101I, 101K, 101L, and 101N have solar power systems (SPS) 103A, 103B, 103C, 103D, 103E, 103F, 103G, 103H, 103I, and 103J, respectively. The solar power systems 103A-103J can provide electric power to the electricity distribution system through the respective transformers 160A-160F. The wires that transmit electric power are shown in FIG. 1B by bold lines.

Figure 2:
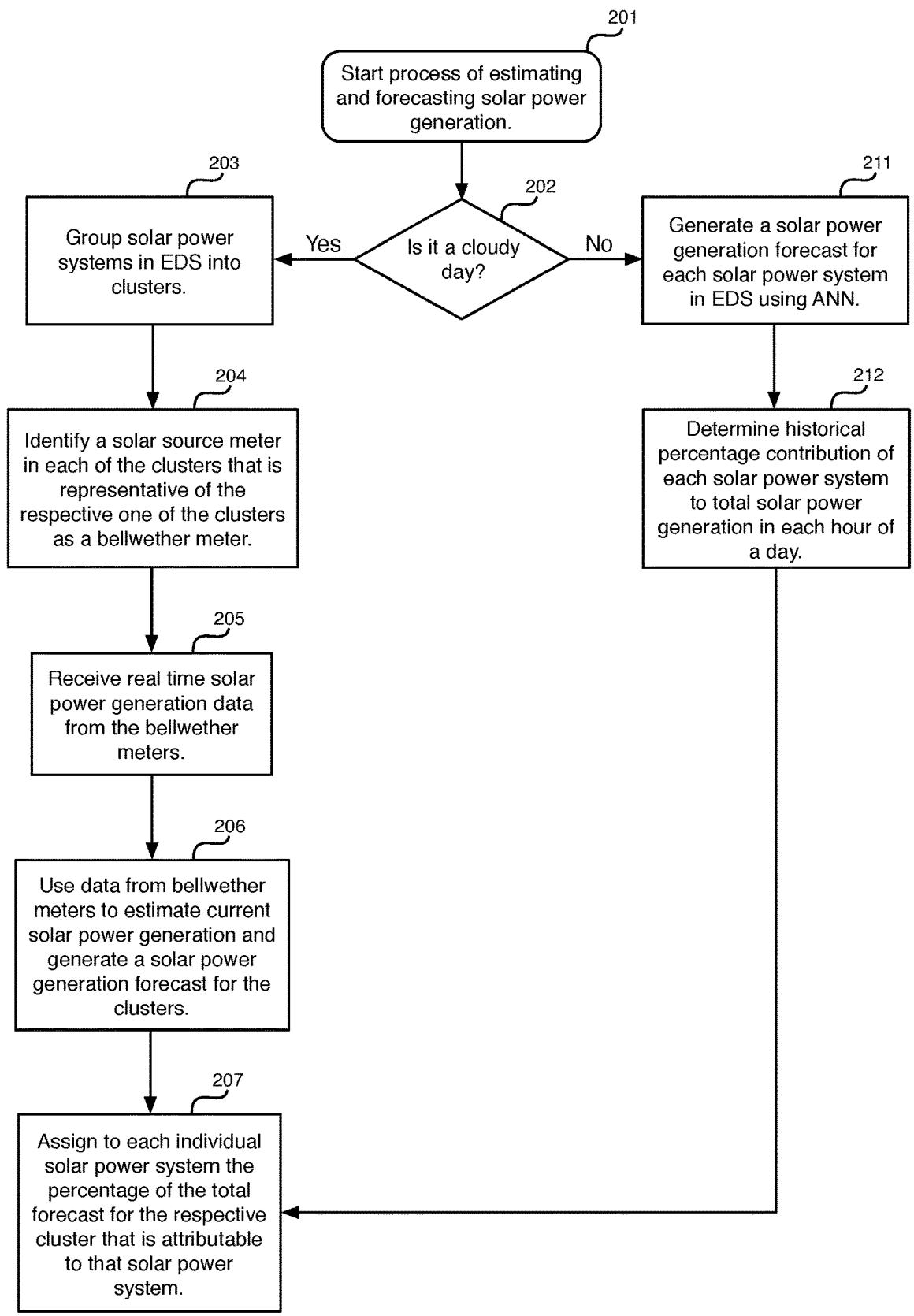
FIG. 2 is a flow chart that illustrates examples of operations that can be performed to generate estimates and forecasts of solar power generation on cloudy days and on sunny days, according to an embodiment.

FIG. 2 is a flow chart that illustrates examples of operations that can be performed to estimate current solar power generation and to generate forecasts of future solar power generation on cloudy days and on sunny days, according to an embodiment. The operations of FIG. 2 can, for example, be performed by a solar power estimation and forecasting system (SPEFS) operating as software that is implemented on computer system 105 using interfaces 111 and 114, processors 112, storage devices 113, and/or database 115.

In operation 201, the SPEFS starts the process of estimating current solar power generation and generating a solar power generation forecast for the solar power generation systems 103 connected to the electricity distribution system (EDS) or any portion thereof. The solar power generation forecast can, for example, be generated for an entire day or any portion of a day. The day for which the forecast is being generated can be, for example, the current day or the next day. The SPEFS can, for example, begin to generate an estimate of the current solar power generation and a solar power generation forecast in response to a request from a user, automatically at certain times of each day, or continuously.

In decision operation 202, the SPEFS determines whether the current day is a cloudy day or a sunny day. This determination can, for example, be made based on a weather forecast, solar irradiance data received from the solar source meters 102, or observations from a user or other individuals. The weather forecast can, for example, be received from a third party weather forecasting service.

If the SPEFS determines that the current day is a cloudy day (e.g., a partly cloudy, mostly cloudy day, or overcast day) in operation 202, then the SPEFS groups the solar power systems 103 in the EDS into clusters in operation 203. The SPEFS groups the solar power systems 103 into clusters based on the physical distances between the solar power systems 103, for example, using an unsupervised k-means clustering algorithm. The SPEFS causes each of the clusters to have solar power systems 103 that are in geospatial proximity to each other. The SPEFS can, for example, generate each of the clusters in operation 203 as a plane figure on a map. The plane figures can include, for example, one or more of polygons (e.g., triangles, rectangles, pentagons, etc.), ellipses, circles, etc. Each of the clusters includes the solar power systems 103 that are located inside the plane figure on the map using, for example, an electric utility's geographical information system (GIS) data that indicates the physical location of each of the solar power systems 103 in the EDS. As another example, the SPEFS can generate each of the clusters in operation 203 as a finite set of points in a local area that are determined using the GIS data.

In some embodiments, the SPEFS can generate the clusters based on input from a user indicating a number of clusters to generate for the EDS. The SPEFS then groups the solar power systems 103 in the EDS into clusters based on geospatial proximity to generate the number of clusters specified by the user. Each cluster can have the same number of solar power systems or different numbers of solar power systems.

Figure 3:
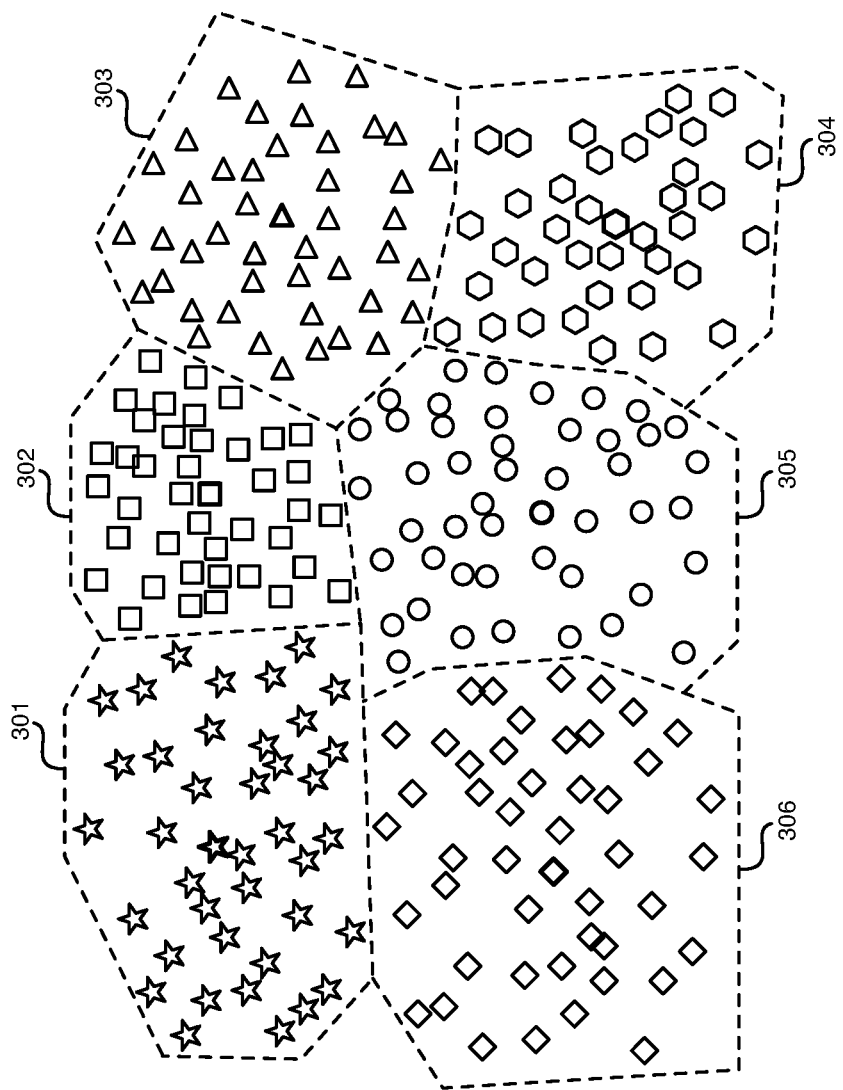
FIG. 3 illustrates examples of clusters of solar power systems in an electricity distribution system that can be generated by a solar power estimation and forecasting system, according to an embodiment.

FIG. 3 illustrates examples of clusters of solar power systems in an electricity distribution system that can be generated by the solar power estimation and forecasting system (SPEFS) in operation 203, according to an embodiment. FIG. 3 illustrates a map of solar power systems in an exemplary electricity distribution system (EDS) or in a portion thereof. FIG. 3 shows 6 clusters 301-306 of the solar power systems 103 that are generated by the SPEFS in operation 203. The 6 clusters 301-306 are bounded by plane figures that are shown as dotted lines in FIG. 3. Each of the clusters 301-306 includes a group of nearby solar power systems in the respective plane figure. The solar power systems 103 in clusters 301, 302, 303, 304, 305, and 306 are illustrated as stars, squares, triangles, hexagons, circles, and diamonds, respectively, in FIG. 3. Clusters 301-306 can, for example, be generated in response to user input indicating to generate 6 clusters of solar power systems and/or user input indicating that any two solar power systems in a cluster have no more than a predefined maximum distance from each other. The clusters 301-306 of FIG. 3 have different numbers of solar power systems. Although in other examples, two or more of the clusters generated in operation 203 can have the same number of solar power systems.

In operation 204, the SPEFS identifies a solar source meter in each of the clusters generated in operation 203 that is representative of the respective one of the clusters as a bellwether meter. In an exemplary embodiment of operation 204, the SPEFS initially determines the centroid (or geometric center) of each one of the clusters generated in operation 203 using one or more suitable geometric techniques. The SPEFS then identifies a solar source meter that is near the centroid of each of the clusters and identifies these solar source meters as bellwether meters. As a more specific example, the SPEFS may determine the solar source meter that is physically closest to the centroid of each of the clusters and identify these solar source meters as bellwether meters. This embodiment of operation 204 can be used by the electric utility, for example, if many, most, or all of the solar power systems in the EDS have solar source meters.

In another exemplary embodiment of operation 204, the SPEFS determines the solar power system that is near or physically closest to the centroid of each of the clusters. The SPEFS then identifies the solar source meters that monitor the power outputs of these solar power systems as bellwether meters. This embodiment can be used by the electric utility, for example, if only a few or none of the solar power systems in the EDS have solar source meters. If any of the solar power systems that are near or physically closest to the centroids of their respective clusters do not have solar source meters, the electric utility can deploy solar source meters at these customer sites after operation 204 to be used as the bellwether solar source meters. The SPEFS can determine the solar power system and/or solar source meter that is physically closest to the centroid of each of the clusters generated in operation 203 using, for example, the GIS data.

Thus, in some embodiments, the SPEFS identifies one representative solar source meter in each of the clusters as being a bellwether solar source meter in operation 204, for example, based on that solar source meter (or its corresponding solar power system) being near or nearest to the centroid of its respective cluster. In these exemplary embodiments, each of the bellwether solar source meters is at or near the centroid of a respective one of the clusters. In other exemplary embodiments, the SPEFS may identify solar source meters that are near the edges of their respective clusters as being bellwether meters.

Figure 4:
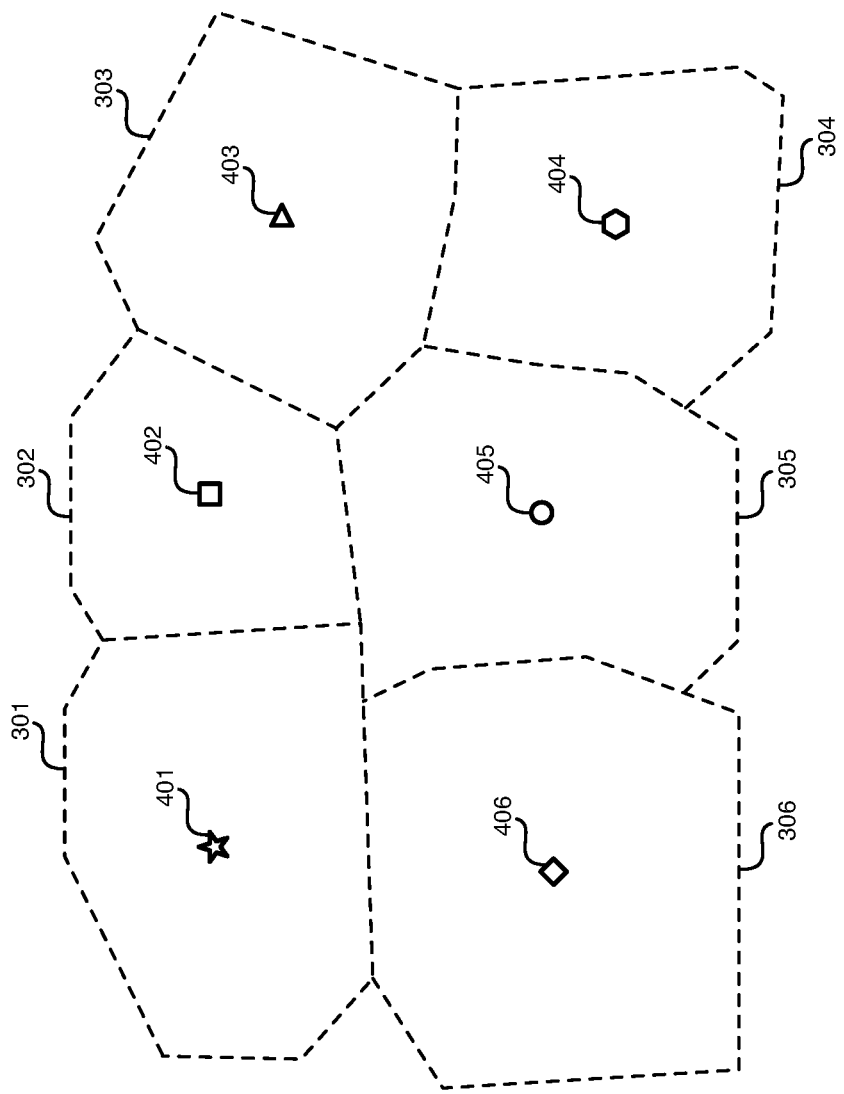
FIG. 4 illustrates examples of bellwether meters identified for the clusters of FIG. 3, according to an embodiment.

FIG. 4 illustrates examples of bellwether meters identified for the clusters 301-306 of FIG. 3, according to an embodiment. In the embodiment of FIG. 4, the SPEFS identifies one bellwether solar source meter that is near the centroid of each one of the six clusters 301-306 in operation 204. As shown in FIG. 4, the SPEFS identifies solar source meters 401-406 as being near the centroids of clusters 301-306, respectively. The SPEFS then selects solar source meters 401-406 as bellwether meters in operation 204.

In operation 205, the SPEFS receives real time solar power generation data from each of the bellwether meters. The SPEFS receives real time solar power generation data from a bellwether meter in each of the clusters generated in operation 203. The real time solar power generation data indicates the current or recent power outputs of the solar power systems monitored by the bellwether meters. The bellwether meters can provide the real time solar power generation data to the SPEFS, for example, in response to requests (e.g., pings) from the SPEFS that are sent through network 104 to the bellwether meters. In some embodiments, the SPEFS can, for example, perform additional iterations of operations 203-204 to update the locations of the clusters and the bellwether meters prior to requesting data from the bellwether meters. As another example, the bellwether meters can automatically provide the real time solar power generation data to the SPEFS continuously or at periodic intervals without waiting for requests from the SPEFS. The real time solar power generation data is provided from the bellwether meters to the computer system 105 through network 104.

In operation 206, the SPEFS generates an estimate of the current solar power generation from the solar power systems 103 in the clusters, and the SPEFS generates a solar power generation forecast for the solar power systems 103 in the clusters. The SPEFS generates the estimate of the current solar power generation from the solar power systems 103 and the solar power generation forecast for systems 103 in operation 206 using solar power generation data from the bellwether meters and unique features of the solar power systems. Because the SPEFS does not need to use data from most of the solar source meters in the clusters (other than the bellwether meters), the SPEFS uses substantially less processing resources to generate the estimate and the forecast than if real time solar power generation data from all of the solar source meters in the EDS were used.

The SPEFS can, for example, generate the estimate of the current solar power generation from the solar power systems 103 in the clusters using historical and real time solar power generation data from the bellwether meters and unique features of the solar power systems in the clusters. The historical solar power generation data from the bellwether meters can, for example, indicate the solar power generation of the bellwether meters on one or more previous sunny days (also referred to herein as historical sunny day solar power generation output). The real time solar power generation data from the bellwether meters indicates the current or recent power output of the solar power systems monitored by the bellwether meters. The real time solar power generation data can be instantaneous power output data that is read by the bellwether meters and transmitted to the SPEFS at computer system 105.

On each cloudy day, the SPEFS divides the real time solar power generation output of each bellwether meter at each time interval (e.g., in each minute) of the current day by the historical sunny day solar power generation output from the same respective bellwether meter at each of the same corresponding time intervals of the day to generate quotients. The SPEFS then multiplies each of these quotients by 100 to generate a percentage for each of the time intervals of the day for each bellwether meter. These percentages indicate the power output measured by the bellwether meters on a cloudy day (e.g., a partly cloudy, mostly cloudy or overcast day) relative to a sunny day. The SPEFS then uses these cloudy day percentages to generate the estimate of the current solar power generation from the solar power systems 103 in operation 206, as described in further detail below.

Figure 5:
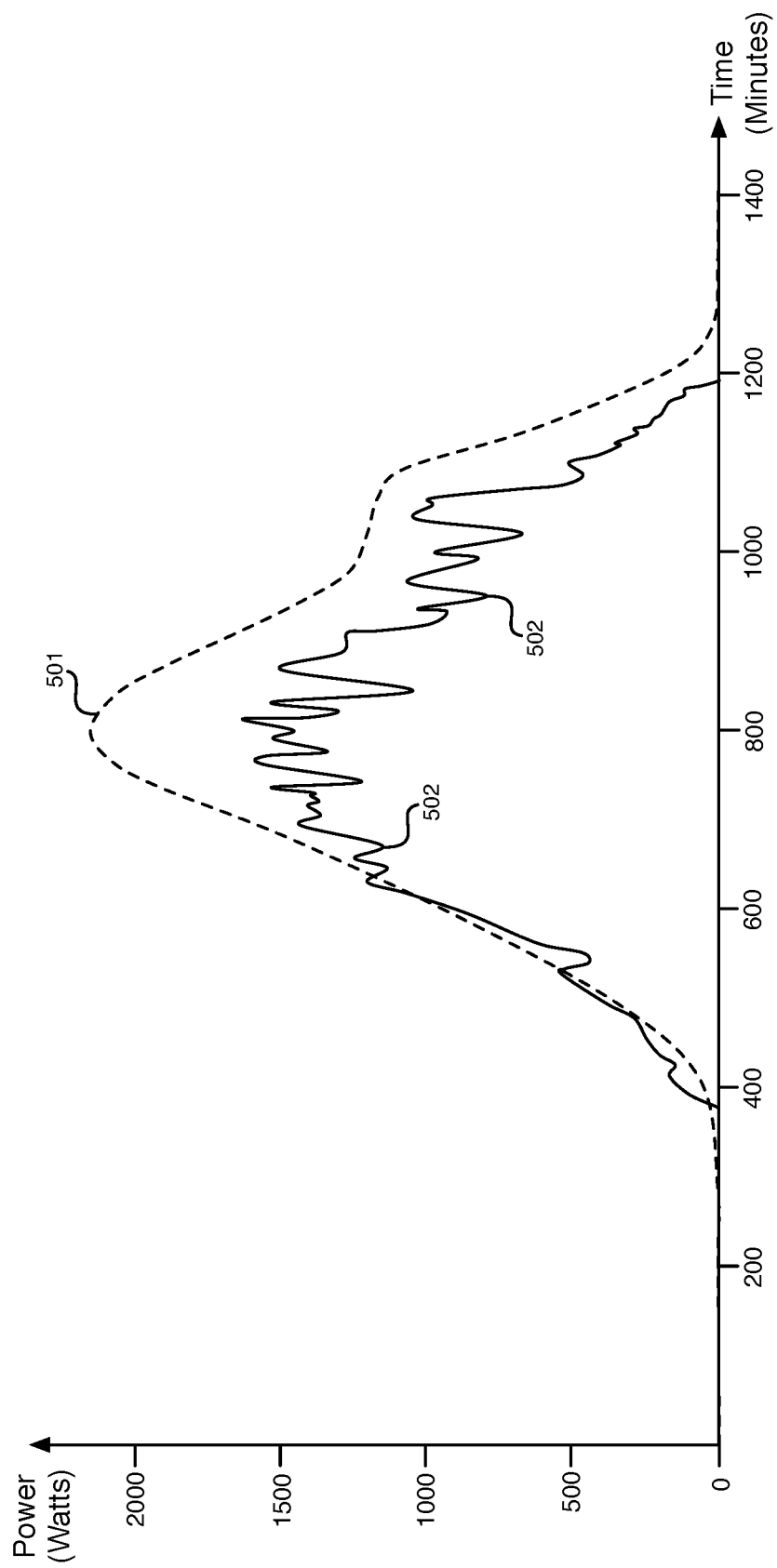
FIG. 5 is a graph that illustrates examples of the real time solar power generation output of a bellwether meter on one day and historical solar power generation output from the same bellwether meter on a previous sunny day, according to an embodiment.

FIG. 5 is a graph that illustrates examples of the real time solar power generation output from a bellwether meter on one day and historical solar power generation output from the same bellwether meter on a previous sunny day, according to an embodiment. The graph of FIG. 5 plots the power output received from the bellwether meter in Watts on the y-axis and time in minutes on the x-axis. FIG. 5 shows two curves 501 and 502 over the 1440 minutes of a single day. Curve 501 indicates the hourly average of the solar power generation output of a solar power system measured by the bellwether meter on a previous sunny day, which is used as the reference data. Curve 502 indicates the real time solar power generation output of the solar power system measured by the same bellwether meter during a cloudy day. In the example of FIG. 5, the solar power output measured by the bellwether meter is substantially less on the cloudy day (curve 502) during the midday and afternoon hours compared to the sunny day (curve 501). Curve 502 is highly variable and mostly within the bounds of curve 501. Table 1 below shows examples of the reference and real time solar power generation output measured by the bellwether meter at 5 different times (in minutes) corresponding to the curves 501-502 of FIG. 5. Only 5 different minutes are shown in Table 1 as examples. The last column of Table 1 shows the percentage (P) power output that the real time data (I) on the cloudy day represents compared to the reference data (R) on a sunny day (P=I/R×100).

TABLE 1

| Time (minutes) | Reference Data (sunny day) | Real Time Data (cloudy day) | Percentage |
|---|---|---|---|
| 681 | 1484.062 | 1167 | 78.64% |
| 686 | 1509.692 | 1336 | 88.49% |
| 691 | 1534.775 | 1295 | 84.38% |
| 696 | 1559.297 | 1295 | 83.05% |
| 701 | 1583.22 | 1306 | 82.49% |

Thus, in the example of FIG. 5, the SPEFS divides the power output indicated by curve 502 at each minute of the cloudy day by the power output indicated by curve 501 at the same minute of the historical sunny day to generate a percentage for each minute.

The SPEFS can make adjustments to the historical solar power generation data received from each bellwether meter on a previous sunny day based on unique features of each of the solar power systems in the respective bellwether meter's cluster to generate sunny day reference values for each of the other solar power systems in the respective cluster. Examples of the unique features that the SPEFS can use to generate the sunny day reference values for each of the other solar power systems in each cluster include the nameplate rating, the day of the year, azimuth, model, shading, tilt, and tracking capability of each of the other solar power systems. The nameplate rating of each solar power system indicates the maximum amount of power output of the solar power system. The azimuth of each solar power system indicates the east-west orientation in degrees of the solar power system (e.g., the solar PV array), which is indicative of the solar power system's position relative to the sun. The shading of each solar power system may, for example, indicate when and how much the solar power system is shaded in each month of a year and/or during each hour of a day. The model of each solar power system may, for example, indicate factors such as an expected lifetime of the solar power system, efficiency of the solar power system, and differences between expected power output of a solar power system and actual power output. The tilt of each solar power system indicates the angle that the solar power system (e.g., a PV solar array) is tilted with respect to the ground. The tracking capability of each solar power system indicates whether the solar power system is able to move with (i.e., track) the changing position of the sun throughout each day.

The SPEFS can use these unique features of the solar power systems in each cluster to make adjustments to the historical solar power generation data for a previous sunny day from the bellwether meter in the respective cluster to create accurate sunny day reference values for each of the other solar power systems that are not monitored by a bellwether meter. For example, the SPEFS can increase or decrease the amplitude of the bellwether meter's solar power generation curve for a previous sunny day (e.g., curve 501) based on the maximum power output of each solar power system in the same cluster as indicated by their nameplate ratings. As another example, the SPEFS can shift the bellwether meter's solar power generation curve for a previous sunny day earlier for east facing solar power systems and later for west facing solar power systems based on the azimuth of each of the other solar power systems in the cluster. As yet another example, the SPEFS can create dips in the bellwether meter's solar power generation curve for a previous sunny day at different times of the year (or different times of day) based on the shading data for the other solar power systems in the cluster. As yet another example, the SPEFS can also make adjustments to the bellwether meter's solar power generation curve for a previous sunny day based on expected solar radiation impacting each solar power system in a cluster on a particular day of the year. The SPEFS adjusts the historical sunny day solar power generation data received from the bellwether meter in each cluster based on these unique features of the solar power systems in the respective clusters to generate sunny day reference values for each of the other solar power systems that are not monitored by a bellwether meter. The sunny day reference values for the other solar power systems include values for each time interval of a day (e.g., in each minute of a day). The SPEFS can generate these sunny day reference values for the other solar power systems using solar power generation data from the bellwether meters and without using solar power generation data from solar source meters that monitor the other solar power systems.

The SPEFS then multiplies the sunny day reference value for each of the other solar power systems in each cluster by the cloudy day percentage described above at a corresponding time interval of the day to generate an estimate of the current solar power generation output of each of the other solar power systems 103 in the clusters in operation 206. The SPEFS then sums the estimates of the current solar power generation output of the other solar power systems in a cluster and the real time solar power generation data from the bellwether meter in the cluster to generate an estimate of the total current solar power generation output of all of the solar power systems in the cluster. As described above, the percentage (P) at each time interval of the day equals the real time solar power generation output (I) measured by a bellwether meter at a corresponding time interval of the current day divided by the historical sunny day solar power generation output (R) measured by the same bellwether meter at the same corresponding time interval of the day times 100 (i.e., P=I/R×100). These calculations are made for each time interval in a day using these percentages based on the concept that the cloud cover over the neighboring solar power systems in a cluster should be about the same in each time interval.

Figure 6A:
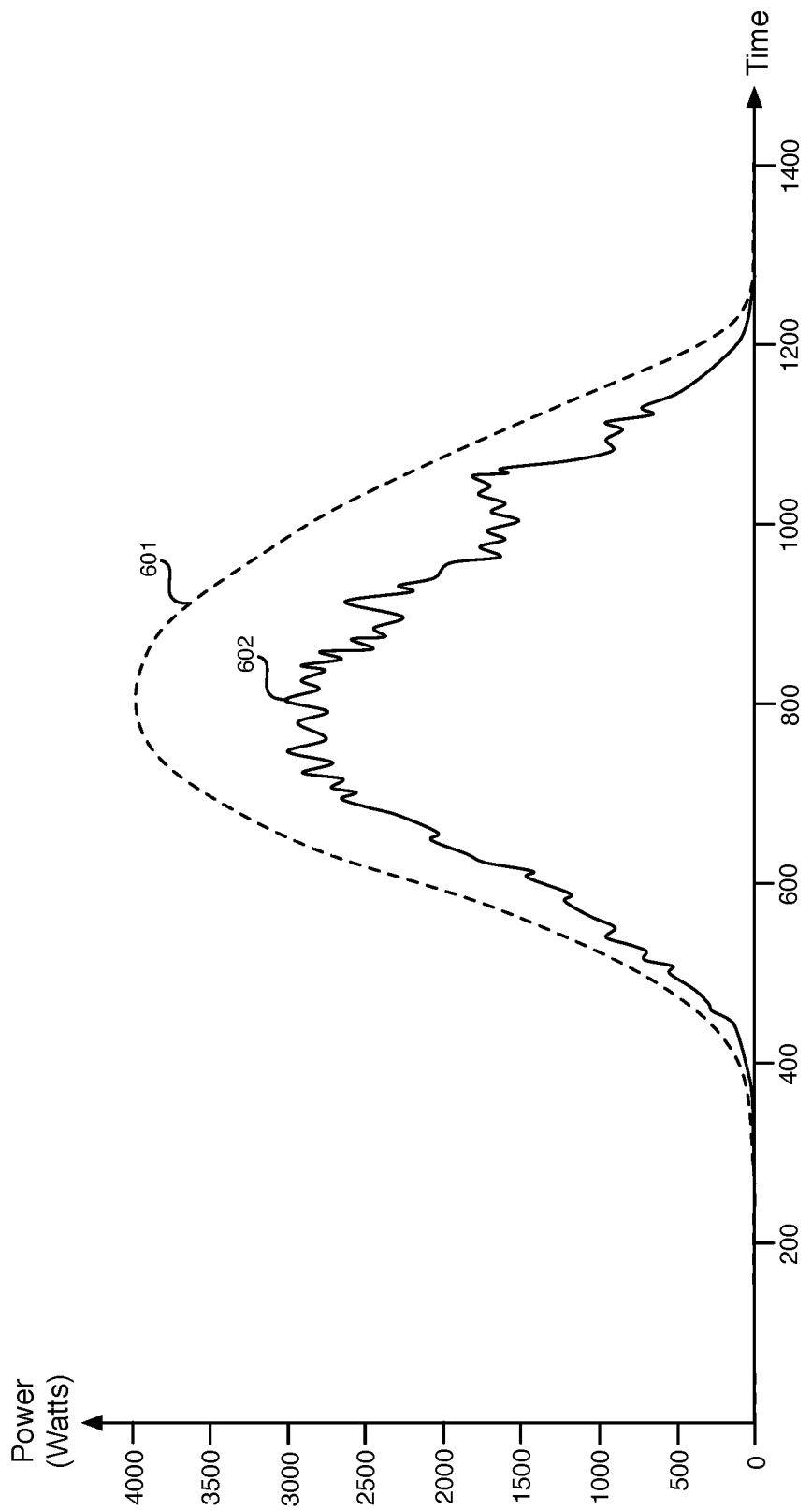
FIGS. 6A and 6B are graphs that illustrate examples of curves indicating the sunny day reference values and estimates of the real time solar power generation from two different solar power systems in a cluster, according to various embodiments.
Figure 6B:
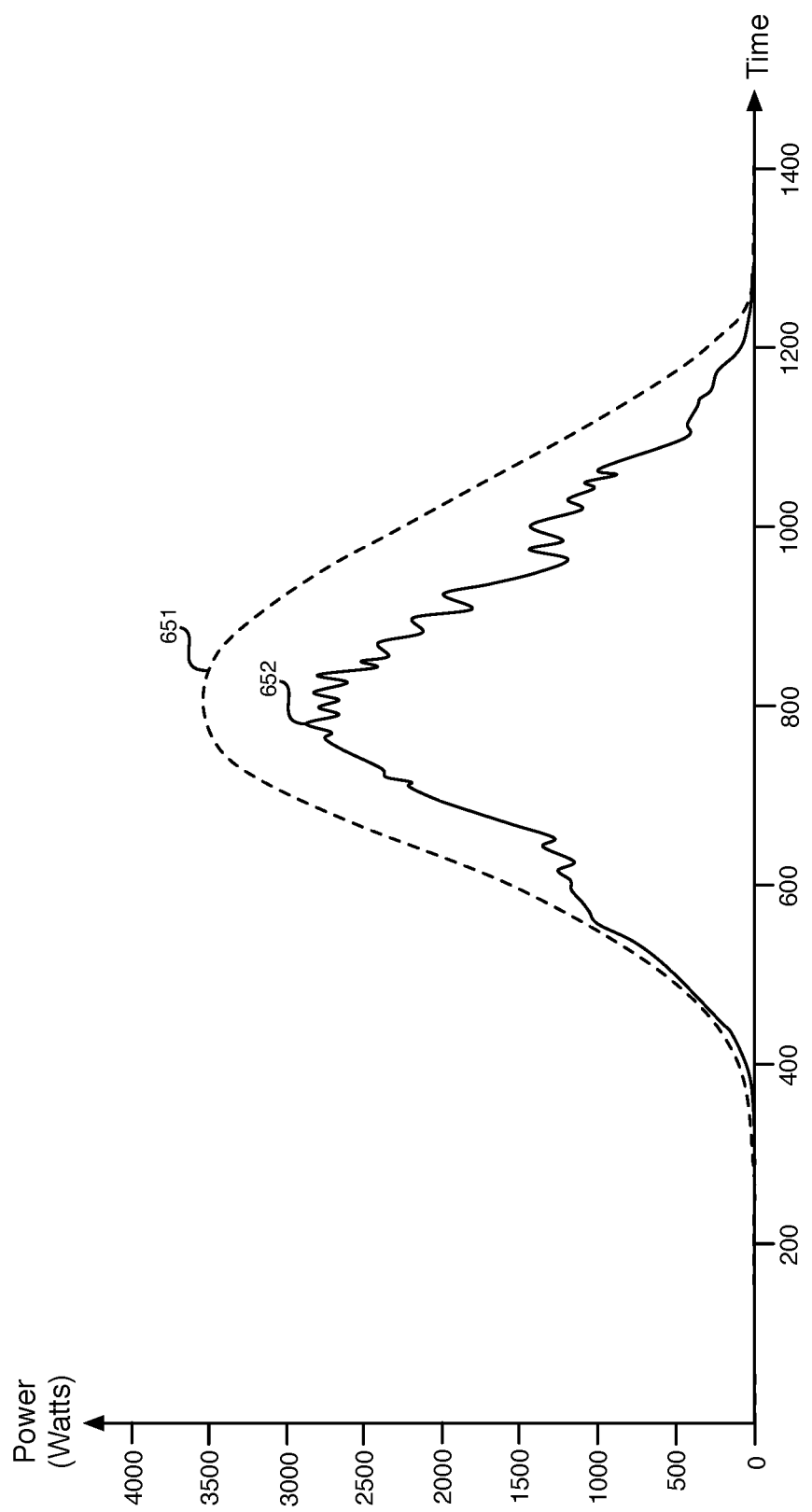

FIGS. 6A and 6B illustrate examples of curves indicating sunny day reference values and estimates of the solar power generation on a cloudy day from two different solar power systems in a cluster, according to various embodiments. FIGS. 6A-6B illustrate curves 601 and 651 that indicate sunny day reference values for first and second solar power systems in a cluster, respectively. The SPEFS generates curves 601 and 651 by adjusting the sunny day reference values of the bellwether meter in the same cluster based on unique features of the first and second solar power systems (e.g., maximum power output, day of the year, azimuth, model, shading, tilt, and tracking capability), as discussed above. FIGS. 6A and 6B also illustrate curves 602 and 652 that indicate estimates of the solar power generation from the first and second solar power systems, respectively, on a cloudy day. The SPEFS generates the estimates indicated by curves 602 and 652 by multiplying the sunny day reference values for each of the first and second solar power systems (as indicated by curves 601 and 651, respectively) by the cloudy day percentages at the corresponding minutes of a day. The cloudy day percentages are generated by dividing the real time solar power generation data received from the bellwether meter on the cloudy day by the sunny day reference data from the bellwether meter. Curves 602 and 652 are substantially less than the sunny day reference values indicated by curves 601 and 651, respectively.

The SPEFS can add together the estimates of the solar power generation of all of the solar power systems in a cluster at the current time to generate an estimate of the total current solar power generation output of all of the solar power systems in the cluster. This technique can be used to generate highly accurate estimates of current solar power generation from all of the clusters of solar power systems in an EDS. The estimates of the current solar power generation of the solar power systems can be used to perform aggregations of the power output provided to various feeders and substations in the EDS based on their connectivity as indicated by the GIS data. These estimates can be used by the operators of the electric utility to provide a highly accurate understanding of the current solar power generation that is being dispatched to the EDS.

In operation 206, the SPEFS also uses solar power generation data from the bellwether meters to generate solar power generation forecasts for the respective clusters where the bellwether meters are located. The SPEFS can, for example, use an artificial neural network (ANN) or another machine learning technique to generate the solar power generation forecast for each cluster with the solar power generation data from the respective bellwether meter as an input. The artificial neural network (ANN) can produce short term solar power generation forecasts for the clusters using the solar power generation data received from the bellwether meters. The SPEFS uses the solar power generation data from each bellwether meter that is representative of a cluster to produce a solar power generation forecast for the solar power systems in the entire cluster.

Figure 7:
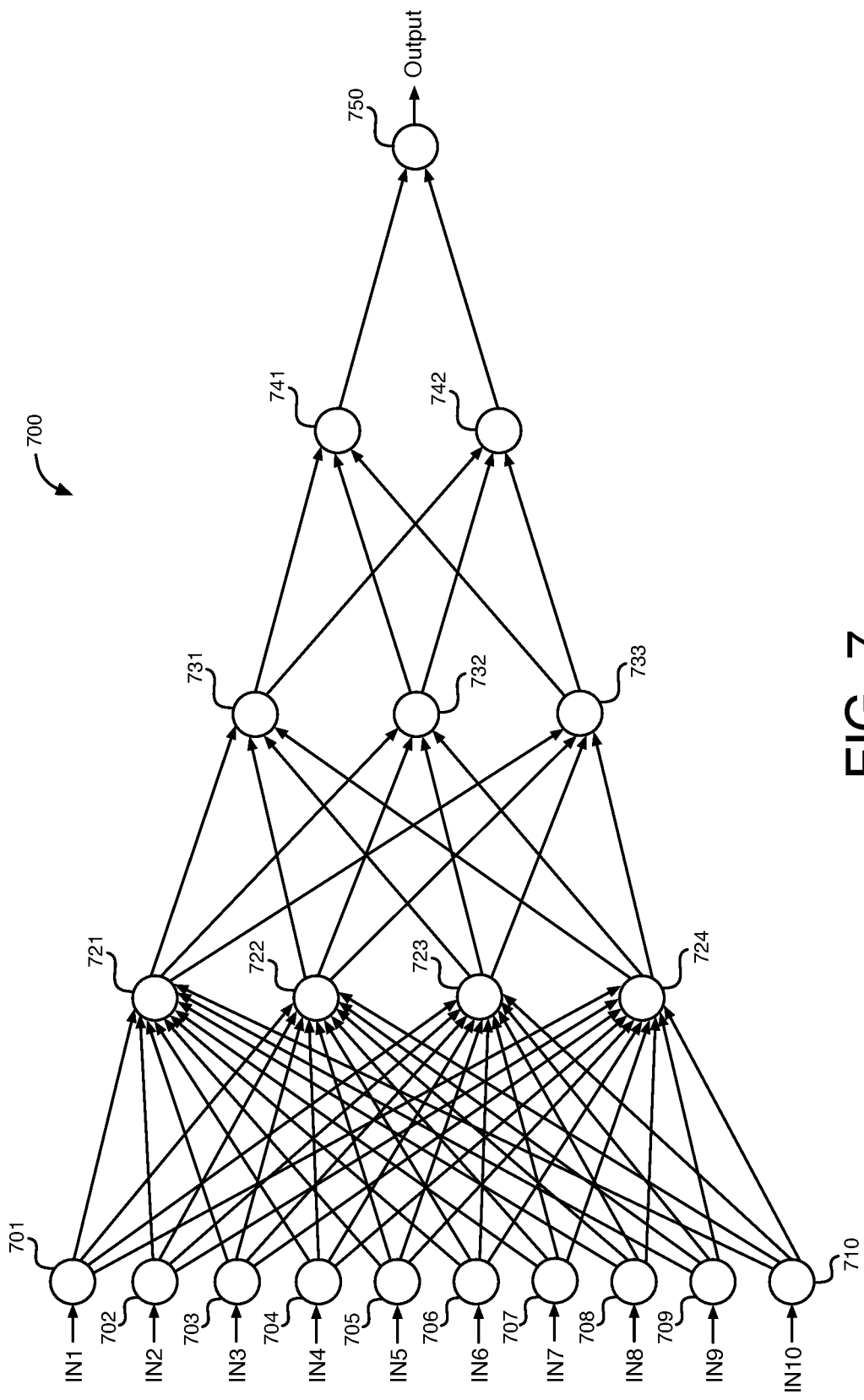
FIG. 7 is a graph that illustrates an example of an artificial neural network (ANN) that can be used to generate a short term solar power forecast for an electricity distribution system, according to an embodiment.

FIG. 7 illustrates a graphical representation of an exemplary artificial neural network (ANN) 700 that can be used to generate a short term solar power generation forecast for an EDS, according to an embodiment. The ANN 700 illustrated in FIG. 7 can be implemented as a software program that is part of the SPEFS running on computer system 105. The ANN 700 of FIG. 7 receives 10 inputs IN1-IN10 at neurons 701-710, respectively. ANN 700 includes 3 hidden layers, with 4 neurons 721-724 in the first hidden layer, 3 neurons 731-733 in the second hidden layer, and 2 neurons 741-742 in the third hidden layer. ANN 700 generates one or more Outputs at neuron 750 in response to the inputs IN1-IN10. The Outputs of ANN 700 indicate a short term solar power generation forecast for the solar power systems in a selected cluster of the EDS. For example, the Outputs of ANN 700 may indicate a 5 minute ahead, 10 minute ahead, and/or 15 minute ahead solar power generation forecast for a selected cluster of solar power systems in the EDS.

Examples of the 10 inputs IN1-IN10 provided to neurons 701-710 in ANN 700 are now discussed. IN1 can be, for example, the current time (e.g., in minutes). IN2 can be, for example, a reference value indicating the total solar power generation of all of the solar power systems in an entire cluster in a time interval of a previous sunny day that corresponds to the current time of day (e.g., bounded in each minute of the day). IN3 can be, for example, a real time read value (e.g., an instantaneous read value) indicating the current solar power generation output of the solar power system monitored by the bellwether meter in the selected cluster at the current time (e.g., updated every minute). IN4 can be, for example, the reference value of IN2 5 minutes ago. IN5 can be, for example, the reference value of IN2 corresponding to the previous real time read value of IN3. IN6 can be, for example, the previous real time read value of IN3 (e.g., 1 minute ago, 5 minutes ago, etc.). IN7 can be, for example, the slope of the previous real time read value of IN3. IN8 can be, for example, the time of the previous real time read value of IN3. IN9 can be, for example, the current air temperature within the local area of the selected cluster (e.g., updated each minute). IN10 can be, for example, the weekly average temperature within the local area of the selected cluster at the current time of day. The current temperature can be determined by a temperature sensor within the local area of the selected cluster. Computer system 105 can calculate the weekly average temperature using historical temperature data received from the temperature sensor or from other historical weather data. Each of the inputs IN1-IN10 to ANN 700 can be updated in each new time interval (e.g., in each minute) with new data.

In an exemplary embodiment, the SPEFS generates the reference values for input IN2 that indicate the total solar power generation of all of the solar power systems in the entire cluster for each time interval over the course of a day (e.g., in each minute or hour) without using the solar power generation data from any solar source meters in the cluster other than the bellwether meter in that cluster. Because this embodiment only uses solar power generation data from the bellwether meter in each cluster to generate the reference values for IN2, this embodiment substantially reduces the number of solar source meters that need to be deployed to monitor the power outputs of the solar power systems in each cluster. The reference values for IN2 can, for example, be generated using historical solar power generation data received from the bellwether meter on one or more previous sunny days. The SPEFS makes adjustments to this historical sunny day solar power generation data from the bellwether meter based on the unique features of each of the solar power systems in the cluster to generate a sunny day solar power generation estimate for each of the other solar power systems in the cluster.

The SPEFS can generate the sunny day solar power generation estimates for the other solar power systems in the cluster that are not monitored by the bellwether meter by making adjustments to the bellwether meter's historical sunny day solar power generation data based on the unique features of the solar power systems in the cluster. The SPEFS can make the adjustments to the bellwether meter's historical sunny day solar power generation data using the same unique features that are discussed above (e.g., nameplate rating, day of the year, azimuth, model, shading, tilt, and tracking capability) to generate the sunny day solar power generation estimates for the other solar power systems in the cluster that are not monitored by the bellwether meter. The SPEFS then adds together the sunny day solar power generation estimates for the other solar power systems in the cluster and the historical solar power generation data received from the bellwether meter in the cluster on a previous sunny day to generate the reference values for input IN2 for the entire cluster. These reference values for input IN2 indicate estimates of the total solar power generation of all of the solar power systems in the selected cluster in each discrete time interval (e.g., in each minute or hour) of a reference sunny day.

According to another exemplary embodiment, the SPEFS can generate the reference values for input IN2 that indicate the total solar power generation output of all of the solar power systems in the entire cluster for each time interval over the course of a sunny day using historical power generation data received from solar source meters that directly monitor the power output of all of the solar power systems in the cluster. The SPEFS generates these reference values by adding together the power generation data of each of the solar power systems as received from the solar source meters in the cluster in each respective time interval over the course of a previous sunny day. In this embodiment, each solar power system has its own solar source meter that generates the power generation data for a sunny day, which may require deployment of a substantial number of solar source meters and a significant amount of processing power. The solar source meters 102 provide the power generation data for a sunny day to computer system 105 through network 104.

The ANN 700 can, for example, be supervised during a training phase in which the ANN program repeats the process of generating a solar power generation forecast and comparing the generated forecast to known solar power generation data thousands of times to minimize the difference between the generated forecast and the known solar power generation data. The known solar power generation data can, for example, be solar power generation data that is measured by one or more of the solar source meters, the bellwether meters, and/or GIS data. During the training phase, the ANN 700 adjusts the values of the connection weights between the neurons 701-710, 721-724, 731-733, and 741-742 to increase the accuracy of the solar power generation forecasts. Each of the arrows connecting two of the neurons 701-710, 721-724, 731-733, and 741-742 in ANN 700 in FIG. 7 represents one of the connection weights.

After the training phase, the SPEFS can use the ANN 700 to generate the solar power generation forecast for each of the clusters using the inputs IN1-IN10, the connection weights that generated the most accurate output data during the training phase, and an activation function. Each of the inputs IN1-IN10 to neurons 701-710 is multiplied by 4 of the connection weights to generate 4 weighted values that are input to the 4 neurons 721-724 in the first hidden layer, as shown by arrows in FIG. 7. Each of the neurons 721-724, 731-733, 741-742, and 750 sums the weighted values of its inputs to generate a sum. Each of the neurons 721-724, 731-733, 741-742, and 750 then applies an activation function to this sum to generate an output. The activation function used in each of the neurons 721-724, 731-733, 741-742, and 750 can be, for example, the rectifier with dropout. The output of each of the neurons 721-724, 731-733, and 741-742 in the hidden layers is multiplied by 3, 2, or 1 of the connection weights, respectively, to generate weighted values that are input to the neuron(s) in the next layer, as shown by arrows in FIG. 7.

Figure 8:
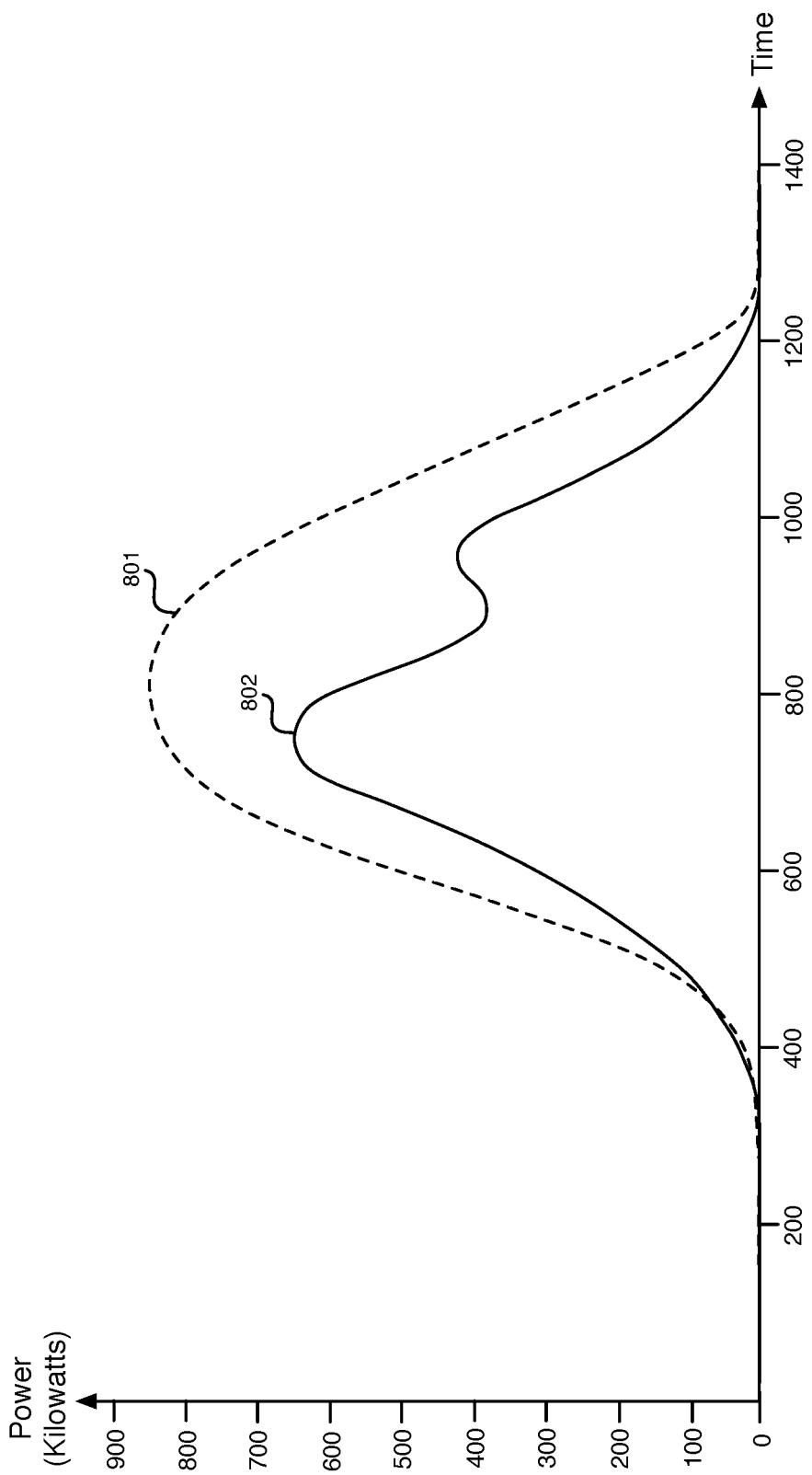
FIG. 8 is a graph that illustrates examples of reference values that indicate the total solar power generation of all the solar power systems in a cluster on a sunny day and a solar power generation forecast for the cluster, according to an embodiment.

FIG. 8 is a graph that illustrates examples of reference values that indicate the total solar power generation of all of the solar power systems in a cluster on a sunny day and a solar power generation forecast for the cluster, according to an embodiment. Curve 801 in FIG. 8 indicates reference values that the SPEFS generates for input IN2 to ANN 700 for a cluster by adding together the sunny day solar power generation data from the bellwether meter in the cluster and the sunny day solar power generation estimates of the other solar power systems in the cluster at corresponding time intervals. Thus, curve 801 indicates the total solar power generation output of the solar power systems in the cluster on a reference sunny day. Curve 802 in FIG. 8 indicates an hourly average of the forecasted short term aggregate solar power generation output for all of the solar power systems in the cluster over the course of a single day. ANN 700 generates the values indicated by curve 802 in response to the input values IN1-IN10. ANN 700 can generate each of the forecasted solar power generation values indicated by curve 802 a few minutes in advance (e.g., 5 minutes, 10 minutes, etc.) of the forecasted solar power output reaching the EDS.

In some embodiments, the electric utility can deploy solar irradiance sensors throughout the geographical area of the EDS. The solar irradiance sensors generate real time solar irradiance values that indicate the amount of solar radiation from the sun that impacts the sensors. The solar irradiance sensors can, for example, be mounted on power distribution poles and spaced apart at intervals throughout the EDS. The solar irradiance values are transmitted from the solar irradiance sensors back to the computer system 105 continuously or at periodic intervals. In some embodiments, the SPEFS can select a solar irradiance sensor that is nearest to or in each of the clusters generated in operation 203 for use in generating the forecast for the respective clusters in operation 206 (e.g., as an input to ANN 700).

Referring again to FIG. 2, in operation 207, the SPEFS assigns to each individual solar power system (and/or the corresponding solar source meter) the percentage of the solar power generation forecast generated in operation 206 for its respective cluster that is attributable to that solar power system. The percentage of the solar power generation forecast generated in operation 206 for a cluster that is attributable to each solar power system in the cluster can, for example, be determined using the historical percentage contribution of each solar power system to the total solar power generation of the cluster throughout a day (e.g., in each minute or hour of a day). The historical percentage contribution of each solar power system in a cluster to the total solar power generation of the cluster throughout a day can, for example, be determined by averaging the historical solar power generation of each solar power system in the cluster relative to the total solar power generation of the cluster over two or more previous days using historical data, as described below with respect to operation 212.

The power generation of an individual solar power system 103 relative to the total power generation of all of the systems 103 in a cluster may change during each day for several reasons. The percentage contribution of each solar power system to the total solar power generation of a cluster may change throughout a day, for example, based on the direction that solar PV panels are facing relative to the changing position of the sun in the sky (i.e., azimuth), changes in shade on solar PV panels from nearby trees or buildings as the sun moves across the sky, or other variable factors. As a specific example, a solar power system that faces east or that is shaded in the afternoon may generate a greater percentage contribution of power to the total power generation of the systems 103 in a cluster during the morning hours and a lesser percentage contribution of power to the total power generation of the systems 103 in the cluster during the afternoon hours. As another example, a solar power system that faces west or that is shaded in the morning may generate a greater percentage contribution of power to the total power generation of the systems 103 in the cluster during the afternoon hours and a lesser percentage contribution of power to the total power generation of the systems 103 in the cluster during the morning hours.

In operation 207, the SPEFS assigns to each solar power system (and/or the corresponding solar source meter) in a cluster the percentage of the solar power generation forecast generated in operation 206 for its cluster that is attributable to that solar power system during each time interval of a day (e.g., each hour from sunrise to sunset). The percentage of the solar power generation forecast for a cluster that is attributable to each solar power system in the cluster in each time interval can be determined using, for example, data indicating the historical average percentage contribution of each solar power system in the cluster to the total solar power generation of that cluster in each hour of each day over two or more previous days.

The percentage of the total solar power generation forecast for each cluster that is assigned to each individual solar power system in each respective cluster in operation 207 can be used by an electric utility to determine the impact of the solar power generation forecast on the EDS. For example, an electric utility can determine the impact on a distribution transformer 160 of the forecasted solar power generation from the solar power systems that are connected to and provide power to that transformer. As another example, an electric utility can determine the impact on an electricity distribution substation of the forecasted solar power generation from the solar power systems that are connected to the local portion of the EDS that is serviced by that distribution substation.

If the SPEFS determines that the current day is not a cloudy day in operation 202 (i.e., it is a sunny day), then the SPEFS generates a solar power generation forecast for each solar power system in the EDS (or a portions of the EDS) using a sunny day artificial neural network (ANN) in operation 211. The determination of whether the current day is a sunny day can, for example, be made based on a weather forecast, solar irradiance data from solar irradiance sensors, or observations from a user or other individuals. The sunny day ANN can, for example, use data indicating the historical hourly power generation of the solar power systems 103, the total power generation of the solar power generation systems 103 from the previous day, and/or the average hourly power generation of the solar power systems 103 from the previous day as inputs to generate the solar power generation forecast in operation 211. The data indicating the historical hourly power generation of the solar power systems 103 that is used to generate the forecast in operation 211 can, for example, include historical hourly power generation of the solar power systems 103 on two or more of the previous days, weeks, or months, and/or the historical hourly power generation of the solar power systems 103 on the same day of the year in one or more previous years. Historical power generation data from one or more previous days may, for example, be received from the solar source meters 102 (e.g., through network 104) at computer system 105.

In operation 212, the SPEFS then calculates the historical percentage contribution of each of the solar power systems 103 to the total solar power generation in each cluster in each hour of a day on one or more previous sunny days. The sunny day ANN can determine the historical percentage contribution of each individual solar power system 103 to the total solar power generation in each cluster during each hour of a day, for example, using historical hourly power generation data received from the solar source meters 102 through network 104 for previous sunny days. The historical percentage contribution of each of the solar power systems 103 changes throughout each day based on changes in the solar power generation of each individual system 103 relative to the total power generation of all of the systems 103 in each respective cluster, as discussed above with respect to operation 207. The SPEFS then assigns to each individual solar power system 103 the percentage of the total forecast generated in operation 211 that is attributable to that solar power system 103 based on the historical percentage contribution of that solar power system 103 calculated in operation 212. The historical percentage contribution of each of the solar power systems 103 to the total solar power generation in each cluster that is generated in operation 212 can, for example, be used as inputs to operation 207 for assigning the percentage of the total solar power forecast on cloudy days, as shown by the arrow from operation 212 to operation 207 in FIG. 2.

The following examples relate to further embodiments. Example 1 is a computer system comprising at least one processor device, wherein the computer system is configured to: group solar power systems that provide electric power to an electricity distribution system into clusters of the solar power systems, wherein each of the clusters comprises a different subset of the solar power systems; identify a solar source meter in each of the clusters that is representative of the respective one of the clusters as a bellwether meter, wherein each of the bellwether meters monitors a power output of one of the solar power systems in one of the clusters; receive solar power generation data from the bellwether meters; and generate a solar power generation forecast for each of the clusters of the solar power systems using the solar power generation data from the bellwether meters in respective ones of the clusters.

In Example 2, the computer system of Example 1 can optionally include wherein the computer system is further configured to: adjust historical sunny day solar power generation data received from each of the bellwether meters based on unique features of the solar power systems in the respective ones of the clusters to generate sunny day solar power generation estimates for the solar power systems in the respective ones of the clusters.

In Example 3, the computer system of any one of Examples 1-2 can optionally include, wherein the computer system is further configured to: add together the sunny day solar power generation estimates for the solar power systems for each respective one of the clusters and the historical sunny day solar power generation data from each respective one of the bellwether meters to generate reference values for each respective one of the clusters.

In Example 4, the computer system of any one of Examples 1-3 can optionally include, wherein the computer system is further configured to: generate the solar power generation forecast for each of the clusters of the solar power systems using an artificial neural network that receives the reference values for each respective one of the clusters and real time solar power generation data from each respective one of the bellwether meters as inputs.

In Example 5, the computer system of any one of Examples 1-4 can optionally include, wherein the computer system is further configured to: identify a solar source meter in each of the clusters that is near a centroid of the respective one of the clusters as the respective bellwether meter, and wherein the computer system generates the solar power generation forecast for each of the clusters of the solar power systems on a cloudy day without using data received from solar source meters in the clusters other than the bellwether meters.

In Example 6, the computer system of any one of Examples 1-5 can optionally include, wherein the computer system is further configured to: generate an estimate of current solar power generation of the solar power systems in each of the clusters using the solar power generation data from the bellwether meters and unique features of the solar power systems, wherein the unique features comprise at least one of maximum power output, azimuth, model, shading, tilt, and tracking capability of each of the solar power systems.

In Example 7, the computer system of any one of Examples 1-6 can optionally include, wherein the computer system is further configured to: adjust historical solar power generation data for a previous sunny day received from the bellwether meter in each of the clusters based on unique features of the solar power systems in the respective ones of the clusters to generate sunny day reference values for the solar power systems; and divide real time solar power generation data from each of the bellwether meters at each time interval of a day by the historical solar power generation data from the respective ones of the bellwether meters at corresponding time intervals of the day to generate a cloudy day percentage for each of the time intervals of the day.

In Example 8, the computer system of any one of Examples 1-7 can optionally include, wherein the computer system is further configured to: multiply the sunny day reference values for the solar power systems in each of the clusters by the cloudy day percentage generated for the bellwether meter in the respective one of the clusters at a current one of the time intervals to generate estimates of current solar power generation of the solar power systems in the clusters.

Example 9 is a non-transitory computer readable storage medium storing instructions executable on a processor in a computer system, the executable instructions comprising: instructions executable to group solar power systems that provide electric power to an electricity distribution system into clusters of the solar power systems, wherein each of the clusters comprises a different subset of the solar power systems; instructions executable to use a solar source meter in each of the clusters that is representative of the respective one of the clusters as a bellwether meter, wherein each of the bellwether meters monitors a power output of one of the solar power systems in one of the clusters; instructions executable to receive solar power generation data from the bellwether meters; and instructions executable to generate an estimate of current solar power generation of the solar power systems in each of the clusters using the solar power generation data received from the bellwether meters.

In Example 10, the non-transitory computer readable storage medium of Example 9 can optionally include, wherein the instructions executable to generate the estimate of the current solar power generation of the solar power systems in each of the clusters further comprise instructions executable to generate the estimate of the current solar power generation of the solar power systems in each of the clusters using unique features of the solar power systems including at least one of maximum power output, azimuth, model, shading, tilt, or tracking capability of the solar power systems.

In Example 11, the non-transitory computer readable storage medium of any one of Examples 9-10 can optionally include, wherein the instructions executable to generate the estimate of the current solar power generation of the solar power systems in each of the clusters further comprise instructions executable to adjust historical sunny day solar power generation data received from the bellwether meter in each of the clusters based on the unique features of the solar power systems in each of the respective ones of the clusters to generate sunny day reference values for the solar power systems.

In Example 12, the non-transitory computer readable storage medium of any one of Examples 9-11 can optionally include, wherein the instructions executable to generate the estimate of the current solar power generation of the solar power systems in each of the clusters further comprise instructions executable to divide real time solar power generation data from each of the bellwether meters at each time interval of a day by the historical sunny day solar power generation data from each respective one of the bellwether meters at corresponding ones of the time intervals of the day to generate a cloudy day percentage for each respective one of the bellwether meters at each of the corresponding ones of the time intervals of the day.

In Example 13, the non-transitory computer readable storage medium of any one of Examples 9-12 can optionally include, wherein the instructions executable to generate the estimate of the current solar power generation of the solar power systems in each of the clusters further comprise instructions executable to: multiply each of the sunny day reference values for the solar power systems in each of the clusters by the cloudy day percentage for the bellwether meter in the respective ones of the clusters at a current one of the time intervals to generate estimates of the current solar power generation of the solar power systems; and add together the estimates of the current solar power generation of the solar power systems and the real time solar power generation data from the bellwether meters to generate the estimate of the current solar power generation of all of the solar power systems.

Example 14 is a method for generating a forecast of solar power generation in an electricity distribution system using at least one processor circuit in a computer system, the method comprising: grouping solar power systems that provide electric power to the electricity distribution system into clusters of the solar power systems such that each of the clusters comprises a different subset of the solar power systems; identifying a solar source meter in each of the clusters that is representative of the respective one of the clusters as a bellwether meter, wherein each of the bellwether meters monitors a power output of one of the solar power systems in one of the clusters; receiving solar power generation data from the bellwether meters; and generating the forecast of the solar power generation of the solar power systems using the solar power generation data received from the bellwether meters.

In Example 15, the method of Example 14 can optionally include, wherein generating the forecast of the solar power generation of the solar power systems further comprises: adjusting historical sunny day solar power generation data received from each of the bellwether meters based on unique features of the solar power systems in the respective ones of the clusters to generate sunny day solar power generation estimates for the solar power systems in the respective ones of the clusters.

In Example 16, the method of any one of Examples 14-15 can optionally include, wherein generating the forecast of the solar power generation of the solar power systems further comprises: adding together the sunny day solar power generation estimates for the solar power systems for each one of the clusters and the historical sunny day solar power generation data received from each respective one of the bellwether meters to generate reference values for each respective one of the clusters.

In Example 17, the method of any one of Examples 14-16 can optionally include, wherein generating the forecast of the solar power generation of the solar power systems further comprises: generating the forecast of the solar power generation of the solar power systems using an artificial neural network that receives the reference values and real time solar power generation data from the bellwether meters as inputs.

In Example 18, the method of any one of Examples 14-17 can optionally include, wherein the unique features comprise at least one of maximum power output, azimuth, model, shading, tilt, and tracking capability of each of the solar power systems.

In Example 19, the method of any one of Examples 14-18 can optionally further comprise: generating an estimate of current solar power generation of the solar power systems in each of the clusters using the real time solar power generation data received from the bellwether meter in each of the clusters, historical solar power generation data for a previous sunny day received from the bellwether meter in each of the clusters, and the unique features of the solar power systems.

In Example 20, the method of any one of Examples 14-19 can optionally include, wherein generating the forecast of the solar power generation of the solar power systems further comprises: generating the forecast of the solar power generation of the solar power systems on a cloudy day without using data received from solar source meters in the clusters other than the bellwether meters.

In Example 21, the method of any one of Examples 14-20 can optionally include, wherein identifying a solar source meter in each of the clusters that is representative of the respective one of the clusters as the bellwether meter further comprises: identifying a solar source meter in each of the clusters that is nearest to a centroid of the respective one of the clusters as the respective bellwether meter.

Example 22 is a computer system comprising at least one processor device, wherein the computer system is configured to: group solar power systems that provide electric power to an electricity distribution system into clusters of the solar power systems; identify a solar source meter in each of the clusters that is representative of the respective one of the clusters as a bellwether meter, wherein each of the bellwether meters monitors a power output of one of the solar power systems in one of the clusters; receive solar power generation data from the bellwether meters; and generate an estimate of current solar power generation of the solar power systems in each of the clusters using the solar power generation data received from the bellwether meters.

In Example 23, the computer system of Example 22 can optionally include, wherein the computer system is further configured to: identify a solar source meter in each of the clusters that is near a centroid of the respective one of the clusters as the respective bellwether meter.

In Example 24, the computer system of any one of Examples 22-23 can optionally include, wherein the computer system is further configured to: adjust historical sunny day solar power generation data received from the bellwether meter in each of the clusters based on unique features of the solar power systems in each of the respective ones of the clusters to generate sunny day reference values for the solar power systems; and divide real time solar power generation data received from each of the bellwether meters at each time interval of a day by the historical sunny day solar power generation data from each respective one of the bellwether meters at corresponding ones of the time intervals of the day to generate a cloudy day percentage for each respective one of the bellwether meters at each of the corresponding ones of the time intervals of the day.

In Example 25, the computer system of any one of Examples 22-24 can optionally include, wherein the computer system is further configured to: multiply each of the sunny day reference values for the solar power systems in each of the clusters by the cloudy day percentage for the bellwether meter in the respective ones of the clusters at a current one of the time intervals to generate estimates of the current solar power generation of the solar power systems; and add together the estimates of the current solar power generation of the solar power systems and the real time solar power generation data from the bellwether meters to generate the estimate of the current solar power generation of all of the solar power systems.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A computer system comprising at least one processor device, wherein the computer system is configured to:
    group solar power systems that provide electric power to an electricity distribution system into clusters of the solar power systems, wherein each of the clusters comprises a different subset of the solar power systems;
    identify a solar source meter in each of the clusters that is representative of the respective one of the clusters as a bellwether meter, wherein each of the bellwether meters monitors a power output of one of the solar power systems in one of the clusters;
    receive solar power generation data from the bellwether meters; and
    generate a solar power generation forecast for each of the clusters of the solar power systems using the solar power generation data from the bellwether meters in respective ones of the clusters.

2. The computer system of claim 1, wherein the computer system is further configured to:
    adjust historical sunny day solar power generation data received from each of the bellwether meters based on unique features of the solar power systems in the respective ones of the clusters to generate sunny day solar power generation estimates for the solar power systems in the respective ones of the clusters.

3. The computer system of claim 2, wherein the computer system is further configured to:
  add together the sunny day solar power generation estimates for the solar power systems for each respective one of the clusters and the historical sunny day solar power generation data from each respective one of the bellwether meters to generate reference values for each respective one of the clusters.

4. The computer system of claim 3, wherein the computer system is further configured to:
  generate the solar power generation forecast for each of the clusters of the solar power systems using an artificial neural network that receives the reference values for each respective one of the clusters and real time solar power generation data from each respective one of the bellwether meters as inputs.

5. The computer system of claim 1, wherein the computer system is further configured to:
  identify a solar source meter in each of the clusters that is near a centroid of the respective one of the clusters as the respective bellwether meter, and
  wherein the computer system generates the solar power generation forecast for each of the clusters of the solar power systems on a cloudy day without using data received from solar source meters in the clusters other than the bellwether meters.

6. The computer system of claim 1, wherein the computer system is further configured to:
  generate an estimate of current solar power generation of the solar power systems in each of the clusters using the solar power generation data from the bellwether meters and unique features of the solar power systems, wherein the unique features comprise at least one of maximum power output, azimuth, model, shading, tilt, and tracking capability of each of the solar power systems.

7. The computer system of claim 1, wherein the computer system is further configured to:
  adjust historical solar power generation data for a previous sunny day received from the bellwether meter in each of the clusters based on unique features of the solar power systems in the respective ones of the clusters to generate sunny day reference values for the solar power systems; and
  divide real time solar power generation data from each of the bellwether meters at each time interval of a day by the historical solar power generation data from the respective ones of the bellwether meters at corresponding time intervals of the day to generate a cloudy day percentage for each of the time intervals of the day.

8. The computer system of claim 7, wherein the computer system is further configured to:
  multiply the sunny day reference values for the solar power systems in each of the clusters by the cloudy day percentage generated for the bellwether meter in the respective one of the clusters at a current one of the time intervals to generate estimates of current solar power generation of the solar power systems in the clusters.

9. A non-transitory computer readable storage medium storing instructions executable on a processor in a computer system, the executable instructions comprising:
  instructions executable to group solar power systems that provide electric power to an electricity distribution system into clusters of the solar power systems, wherein each of the clusters comprises a different subset of the solar power systems;
  instructions executable to use a solar source meter in each of the clusters that is representative of the respective one of the clusters as a bellwether meter, wherein each of the bellwether meters monitors a power output of one of the solar power systems in one of the clusters;
  instructions executable to receive solar power generation data from the bellwether meters; and
  instructions executable to generate an estimate of current solar power generation of the solar power systems in each of the clusters using the solar power generation data received from the bellwether meters.

10. The non-transitory computer readable storage medium of claim 9, wherein the instructions executable to generate the estimate of the current solar power generation of the solar power systems in each of the clusters further comprise instructions executable to generate the estimate of the current solar power generation of the solar power systems in each of the clusters using unique features of the solar power systems including at least one of maximum power output, azimuth, model, shading, tilt, or tracking capability of the solar power systems.

11. The non-transitory computer readable storage medium of claim 10, wherein the instructions executable to generate the estimate of the current solar power generation of the solar power systems in each of the clusters further comprise instructions executable to adjust historical sunny day solar power generation data received from the bellwether meter in each of the clusters based on the unique features of the solar power systems in each of the respective ones of the clusters to generate sunny day reference values for the solar power systems.

12. The non-transitory computer readable storage medium of claim 11, wherein the instructions executable to generate the estimate of the current solar power generation of the solar power systems in each of the clusters further comprise instructions executable to divide real time solar power generation data from each of the bellwether meters at each time interval of a day by the historical sunny day solar power generation data from each respective one of the bellwether meters at corresponding ones of the time intervals of the day to generate a cloudy day percentage for each respective one of the bellwether meters at each of the corresponding ones of the time intervals of the day.

13. The non-transitory computer readable storage medium of claim 12, wherein the instructions executable to generate the estimate of the current solar power generation of the solar power systems in each of the clusters further comprise instructions executable to:
  multiply each of the sunny day reference values for the solar power systems in each of the clusters by the cloudy day percentage for the bellwether meter in the respective ones of the clusters at a current one of the time intervals to generate estimates of the current solar power generation of the solar power systems; and
  add together the estimates of the current solar power generation of the solar power systems and the real time solar power generation data from the bellwether meters to generate the estimate of the current solar power generation of all of the solar power systems.

14. A method for generating a forecast of solar power generation in an electricity distribution system using at least one processor circuit in a computer system, the method comprising:
  grouping solar power systems that provide electric power to the electricity distribution system into clusters of the solar power systems such that each of the clusters comprises a different subset of the solar power systems;

identifying a solar source meter in each of the clusters that is representative of the respective one of the clusters as a bellwether meter, wherein each of the bellwether meters monitors a power output of one of the solar power systems in one of the clusters;

receiving solar power generation data from the bellwether meters; and generating the forecast of the solar power generation of the solar power systems using the solar power generation data received from the bellwether meters.

15. The method of claim 14, wherein generating the forecast of the solar power generation of the solar power systems further comprises:

adjusting historical sunny day solar power generation data received from each of the bellwether meters based on unique features of the solar power systems in the respective ones of the clusters to generate sunny day solar power generation estimates for the solar power systems in the respective ones of the clusters.

16. The method of claim 15, wherein generating the forecast of the solar power generation of the solar power systems further comprises:

adding together the sunny day solar power generation estimates for the solar power systems for each one of the clusters and the historical sunny day solar power generation data received from each respective one of the bellwether meters to generate reference values for each respective one of the clusters.

17. The method of claim 16, wherein generating the forecast of the solar power generation of the solar power systems further comprises:

generating the forecast of the solar power generation of the solar power systems using an artificial neural network that receives the reference values and real time solar power generation data from the bellwether meters as inputs.

18. The method of claim 17, wherein the unique features comprise at least one of maximum power output, azimuth, model, shading, tilt, and tracking capability of each of the solar power systems.

19. The method of claim 18 further comprising:

generating an estimate of current solar power generation of the solar power systems in each of the clusters using the real time solar power generation data received from the bellwether meter in each of the clusters, historical solar power generation data for a previous sunny day received from the bellwether meter in each of the clusters, and the unique features of the solar power systems.

20. The method of claim 14, wherein generating the forecast of the solar power generation of the solar power systems further comprises:

generating the forecast of the solar power generation of the solar power systems on a cloudy day without using data received from solar source meters in the clusters other than the bellwether meters.

21. The method of claim 14, wherein identifying a solar source meter in each of the clusters that is representative of the respective one of the clusters as the bellwether meter further comprises:

identifying a solar source meter in each of the clusters that is nearest to a centroid of the respective one of the clusters as the respective bellwether meter.

22. A computer system comprising at least one processor device, wherein the computer system is configured to:

group solar power systems that provide electric power to an electricity distribution system into clusters of the solar power systems;

identify a solar source meter in each of the clusters that is representative of the respective one of the clusters as a bellwether meter, wherein each of the bellwether meters monitors a power output of one of the solar power systems in one of the clusters;

receive solar power generation data from the bellwether meters; and generate an estimate of current solar power generation of the solar power systems in each of the clusters using the solar power generation data received from the bellwether meters.

23. The computer system of claim 22, wherein the computer system is further configured to:

identify a solar source meter in each of the clusters that is near a centroid of the respective one of the clusters as the respective bellwether meter.

24. The computer system of claim 22, wherein the computer system is further configured to:

adjust historical sunny day solar power generation data received from the bellwether meter in each of the clusters based on unique features of the solar power systems in each of the respective ones of the clusters to generate sunny day reference values for the solar power systems; and divide real time solar power generation data received from each of the bellwether meters at each time interval of a day by the historical sunny day solar power generation data from each respective one of the bellwether meters at corresponding ones of the time intervals of the day to generate a cloudy day percentage for each respective one of the bellwether meters at each of the corresponding ones of the time intervals of the day.

25. The computer system of claim 24, wherein the computer system is further configured to:

multiply each of the sunny day reference values for the solar power systems in each of the clusters by the cloudy day percentage for the bellwether meter in the respective ones of the clusters at a current one of the time intervals to generate estimates of the current solar power generation of the solar power systems; and add together the estimates of the current solar power generation of the solar power systems and the real time solar power generation data from the bellwether meters to generate the estimate of the current solar power generation of all of the solar power systems.

* * * * *